United States Patent
Takita

(10) Patent No.: US 12,081,710 B2
(45) Date of Patent: Sep. 3, 2024

(54) IMAGE READING DEVICE AND IMAGE READING METHOD

(71) Applicant: SEIKO EPSON CORPORATION, Tokyo (JP)

(72) Inventor: Kazuya Takita, Shimonoseki (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/508,480

(22) Filed: Nov. 14, 2023

(65) Prior Publication Data
US 2024/0171692 A1    May 23, 2024

(30) Foreign Application Priority Data

Nov. 17, 2022   (JP) ................. 2022-184226

(51) Int. Cl.
*H04N 1/04*    (2006.01)
*H04N 1/00*    (2006.01)

(52) U.S. Cl.
CPC ....... *H04N 1/00745* (2013.01); *H04N 1/0071* (2013.01); *H04N 1/00716* (2013.01); *H04N 1/00729* (2013.01)

(58) Field of Classification Search
None
See application file for complete search history.

(56) References Cited

U.S. PATENT DOCUMENTS

| | | | |
|---|---|---|---|
| 2020/0036850 A1* | 1/2020 | Hirayama | G06T 7/0008 |
| 2020/0204695 A1* | 6/2020 | Sakai | H04N 1/00745 |
| 2021/0067651 A1* | 3/2021 | Beppu | H04N 1/00824 |
| 2021/0084181 A1* | 3/2021 | Sakai | H04N 1/00602 |
| 2021/0084182 A1* | 3/2021 | Sakai | H04N 1/0057 |
| 2021/0155430 A1* | 5/2021 | Furukawa | H04N 1/00591 |
| 2022/0256041 A1* | 8/2022 | Takita | H04N 1/00824 |

FOREIGN PATENT DOCUMENTS

JP    2021-042068 A    3/2021

\* cited by examiner

*Primary Examiner* — Dung D Tran
(74) *Attorney, Agent, or Firm* — WORKMAN NYDEGGER

(57) ABSTRACT

When a multi-feed of a document is detected, an image reading device acquires a document width from image data generated by a reading unit reading a leading end portion of the document. The document width is a length of the document in a width direction intersecting a transport direction. When, based on the document width, the size of the document corresponds to a specific size of a plastic card or an instant film, the image reading device does not execute error processing in response to an occurrence of the multi-feed, and when the size of the document does not correspond to the specific size, the image reading device executes the error processing.

10 Claims, 11 Drawing Sheets

IMAGE READING DEVICE AND IMAGE READING METHOD

The present application is based on, and claims priority from JP Application Serial Number 2022-184226, filed Nov. 17, 2022, the disclosure of which is hereby incorporated by reference herein in its entirety.

BACKGROUND

1. Technical Field

The present disclosure relates to an image reading device and an image reading method.

2. Related Art

In a scanner using an image sensor to read a document, which is an object to be read, while transporting the document, multi-feed detection using ultrasonic waves is performed. The term "multi-feed" refers to a state in which a plurality of documents, which are to be transported one sheet at a time, are transported in an overlapped manner. The multi-feed is regarded as a transport error, and when it occurs, transport and reading of the document are stopped. Note that, in contrast to the multi-feed, a state in which the documents are transported one sheet at a time is referred to as a single-feed.

There has been a problem in that even when the single-feed is actually performed, it is erroneously detected as the multi-feed. For example, since a plastic card is thicker than a general paper sheet, when the plastic card is transported as the document, even when the single-feed is actually performed, it is likely to be erroneously detected as the multi-feed. As a result, the transport of the document is stopped.

As related art, a medium transport device is disclosed that detects a degree of roundness at a corner of a medium from an input image that has captured an image of the medium being transported, determines whether or not the medium is an ID card based on the degree of roundness, controls a transport unit based on a determination result, and outputs the determination result (see JP-A-2021-42068).

If erroneous detection of the multi-feed is accepted, the efficiency of image reading processing deteriorates, which is disadvantageous to a user. On the other hand, if the multi-feed has actually occurred, early determination of the fact is beneficial to the user. Thus, there is a demand to make improvements in order to comprehensively increase the accuracy of determining whether or not the multi-feed has occurred by taking into account the presence of documents that are likely to be erroneously detected.

SUMMARY

An image reading device includes a transport unit configured to transport a document in a predetermined transport direction, a reading unit configured to read the document transported by the transport unit, a multi-feed detector provided at a position upstream of the reading unit in the transport direction and configured to detect a multi-feed of the document, and a control unit. When the multi-feed detector detects the multi-feed of the document, the control unit acquires a document width from image data generated by the reading unit reading a leading end portion of the document, the document width being a length of the document in a width direction intersecting the transport direction, determines, based on the document width, whether a size of the document corresponds to a size of a plastic card or an instant film, does not execute error processing in response to an occurrence of the multi-feed when it is determined that the size of the document corresponds to the size of the plastic card or the instant film, and executes the error processing when it is determined that the size of the document does not correspond to the size of the plastic card or the instant film.

An image reading method includes a transporting step for transporting a document in a predetermined transport direction, a reading step for reading the transported document by a reading unit, a multi-feed detecting step for detecting a multi-feed of the document at a position upstream of the reading unit in the transport direction, and a control step. When the multi-feed of the document is detected by the detecting the multi-feed of the document, the control step includes acquiring a document width from image data generated by the reading unit reading a leading end portion of the document, the document width being a length of the document in a width direction intersecting the transport direction, determining, based on the document width, whether a size of the document corresponds to a size of a plastic card or an instant film, not executing error processing in response to an occurrence of the multi-feed when it is determined that the size of the document corresponds to the size of the plastic card or the instant film, and executing the error processing when it is determined that the size of the document does not correspond to the size of the plastic card or the instant film.

DESCRIPTION OF EMBODIMENTS

Embodiments of the present disclosure are described below with reference to the drawings. Note that each of the drawings is merely illustrative for describing the embodiments. Since the drawings are illustrative, proportions, shapes, and shading may not be precise, consistent, or may be partially omitted.

1. Overall Description of Device Configuration

Figure 1:
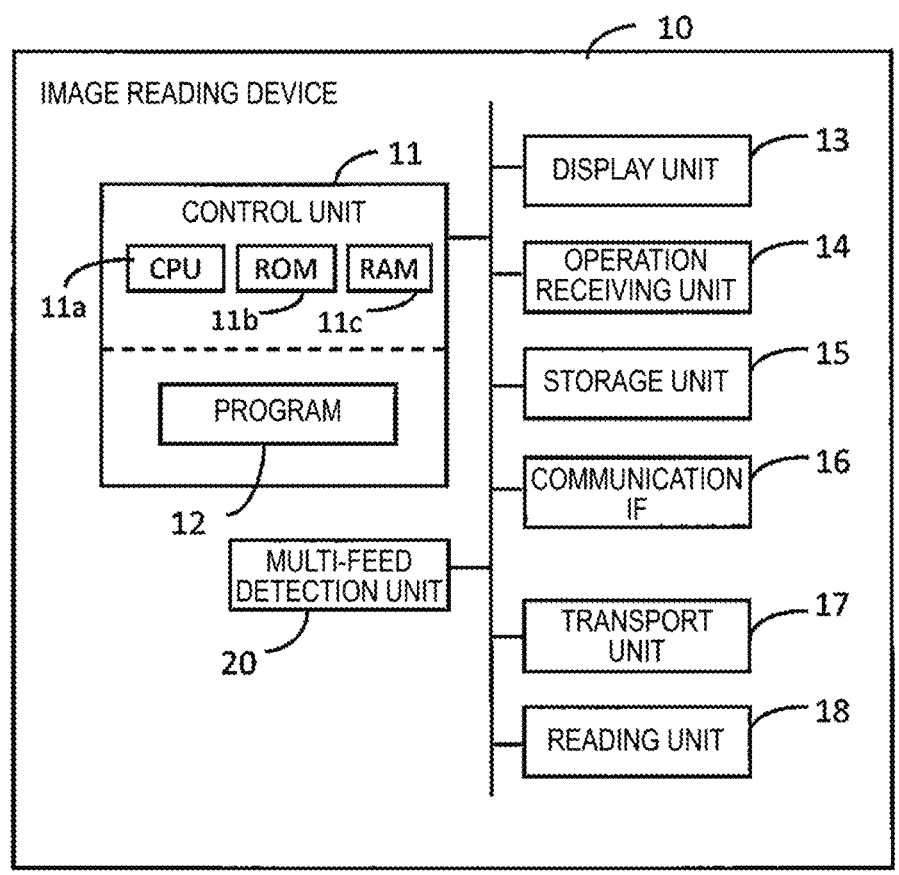
FIG. 1 is a diagram illustrating a device configuration in a simplified manner.

FIG. 1 illustrates a configuration of an image reading device 10 according to a present embodiment in a simplified manner. The image reading device 10 performs an image reading method. The image reading device 10 is a sheet-feed type scanner, and includes a control unit 11, a display unit 13, an operation reception unit 14, a storage unit 15, a communication IF 16, a transport unit 17, a reading unit 18, and a multi-feed detector 20, and the like. IF is an abbreviation for interface. The control unit 11 includes, as a processor, one or more ICs including a CPU 11a, a ROM 11b, a RAM 11c, and the like, another non-volatile memory, and the like.

In the control unit 11, the processor, that is, the CPU 11a executes arithmetic processing in accordance with a program 12 stored in the ROM 11b, the other memory, or the like, using the RAM 11c or the like as a work area, to execute processing according to the present embodiment. The processor is not limited to the single CPU, and a configuration may be adopted in which the processing is executed by a hardware circuit such as a plurality of CPUs, an ASIC, or the like, or a configuration may be adopted in which the CPU and the hardware circuit work in concert to execute the processing.

The display unit 13 is a unit for displaying visual information, and is constituted, for example, by a liquid crystal display, an organic EL display, or the like. The display unit 13 may include a display and a drive circuit for driving the display.

The operation reception unit 14 is a unit that receives an operation or an input by a user, and is realized, for example, by a physical button, a touch panel, a mouse, a keyboard, or the like. The operation reception unit 14 as a touch panel may be realized as a function of the display unit 13.

The display unit 13 and the operation reception unit 14 may be peripheral devices externally coupled to the image reading device 10.

For example, the storage unit 15 is a storage unit such as a hard disk drive, a solid state drive, and another memory. A portion of the memory included in the control unit 11 may be regarded as the storage unit 15. The storage unit 15 may be regarded as a portion of the control unit 11.

The communication IF 16 is a generic term for one or a plurality of IFs for establishing communication with an external device in a wired or wireless manner, in accordance with a prescribed communication protocol including a known communication standard. For example, the external device is a terminal such as a personal computer, a server, a smartphone, and a tablet type terminal.

The transport unit 17 is a unit that transports a document, which is an object to be read, along a predetermined transport path. For example, the transport unit 17 includes a roller that rotates to transport a document, a motor as a driving source for rotation, and the like. The transport unit 17 also includes a so-called auto document feeder (ADF) function capable of sequentially transporting a plurality of documents one sheet at a time, which are placed on a document tray.

The reading unit 18 is a unit that optically reads a document transported by the transport unit 17. The reading unit 18 includes a general configuration as a scanner, including a light source that irradiates a document, an image sensor that receives reflected light or transmitted light from a document, converts the light photoelectrically to generate an electrical signal as a result of reading, and outputs the electrical signal, an analog front end that converts the output from the image sensor to a digital signal to obtain image data, and the like. The image sensor of the reading unit 18 is a line sensor including a plurality of imaging elements arranged side by side along a width direction D2 orthogonal to a transport direction D1 described later, and reads an image of one line in one reading operation. The reading unit 18 obtains two-dimensional image data by repeatedly reading the image of one line at a predetermined frequency.

Figure 2:
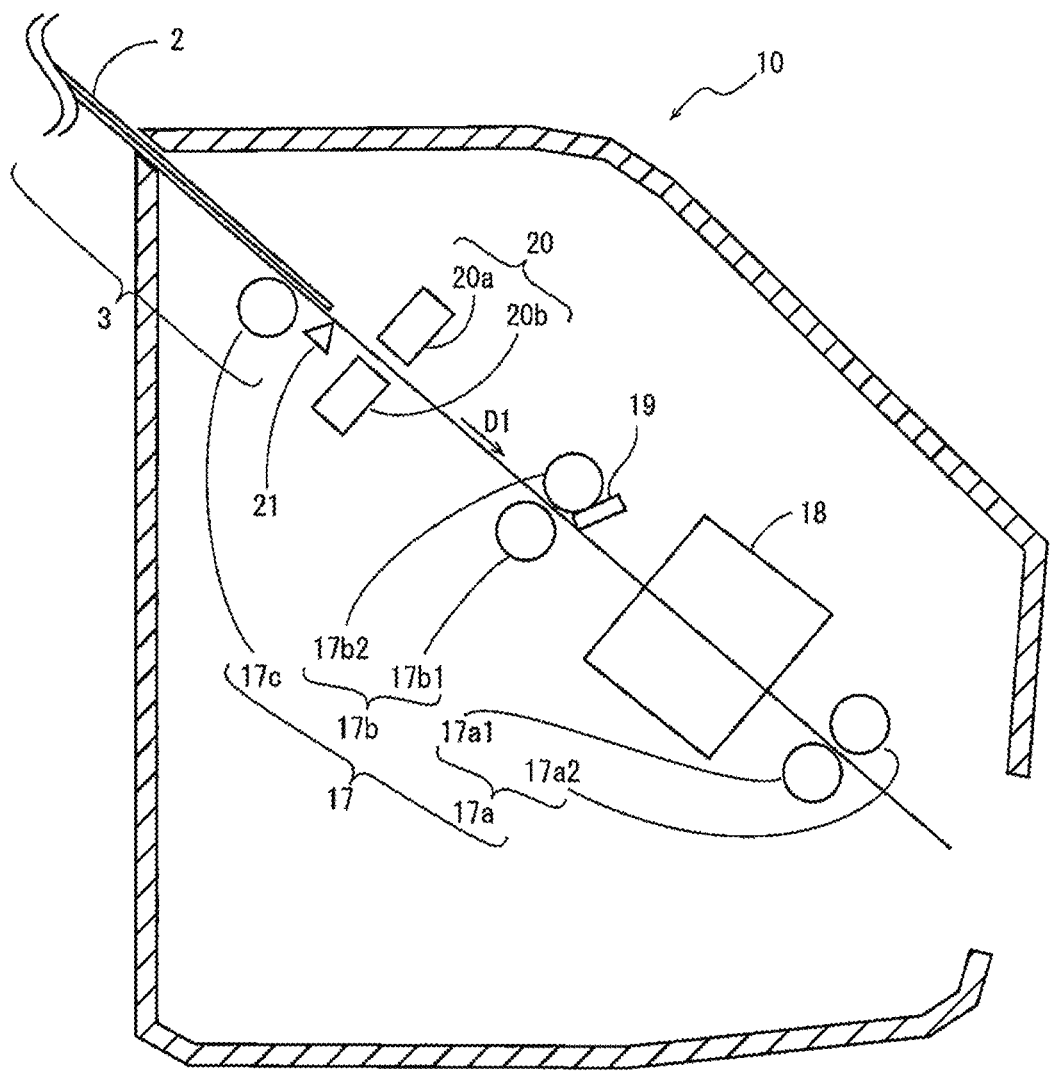
FIG. 2 is a diagram illustrating an internal configuration of an image reading device from a side viewpoint in a simplified manner.

FIG. 2 mainly illustrates an internal configuration of the image reading device 10 from a side viewpoint in a simplified manner. The image reading device 10 includes a placement unit 3 on which a document 2 is placed. The placement unit 3 is a document tray. The transport unit 17 transports the document 2 placed on the placement unit 3 in a predetermined transport path. The transport unit 17 includes a sheet feeding roller pair 17b including rollers 17b1 and 17b2 that are arranged to face each other with the transport path therebetween and a sheet discharging roller pair 17a including rollers 17a1 and 17a2 that are similarly arranged to face each other. For example, the roller 17b1 and the roller 17a1 that are arranged on the lower side of the transport path are coupled to a motor (not illustrated), and are rotated by a driving force applied from the motor. The direction along the transport path is referred to as the transport direction D1. The transport unit 17 transports the document 2 in the transport direction D1. Upstream and downstream in the transport direction D1 are simply referred to as upstream and downstream.

The sheet feeding roller pair 17b is arranged upstream of the reading unit 18, and transports the document 2 downstream. The sheet discharging roller pair 17a is arranged downstream of the reading unit 18, and transports the document 2 read by the reading unit 18 downstream to discharge the document 2. For example, an edge sensor 19 that detects an edge of the document 2 may be provided at a position in the vicinity of the sheet feeding roller pair 17b. At a position upstream of the sheet feeding roller pair 17b and close to the placement unit 3, a load roller 17c as a portion of the transport unit 17 is provided. The load roller 17c draws out the document 2 one sheet at a time, from the placement unit 3 into the transport path. In other words, it is ideal that the load roller 17c can draw out the document 2 one sheet at a time, from the placement unit 3 into the transport path every time without fail. In this case, the multi-feed does not occur. However, the load roller 17c sometimes draws out, for example, two sheets of the document 2 into the transport path at the same time, and as a result, the multi-feed occurs.

In the example illustrated in FIG. 2, the reading unit 18 is provided on the upper side and the lower side of the transport path to sandwich the transport path therebetween, and is capable of reading both the surfaces of the document 2 at the same time. In other words, the reading unit 18 reads the upper surface of the document 2 with an image sensor provided on the upper side of the transport path, and reads the lower surface of the document 2 with an image sensor provided on the lower side of the transport path. However, it is not necessarily required that the image reading device 10 be a product capable of reading both the surfaces of the document 2 at the same time. For example, the image reading device 10 may be a product in which the reading unit 18 reads a downward facing surface of the document 2 being transported with the image sensor provided on the lower side of the transport path, the transport unit 17 causes the document 2 to make a U-turn, eventually allowing the reading unit 18 to read both the surfaces of the document 2. Alternatively, the image reading device 10 may be a product capable of reading only one surface of both the surfaces of the document 2.

The multi-feed detector 20 and a document detection sensor 21 are provided at positions upstream of the sheet feeding roller pair 17b and downstream of the load roller 17c. In the example illustrated in FIG. 2, the document detection sensor 21 is located upstream of the multi-feed detector 20. The multi-feed detector 20 includes a transmission unit 20a and a reception unit 20b facing each other with the transport path sandwiched therebetween, at positions upstream of the reading unit 18, respectively. The transmission unit 20a transmits ultrasonic waves, and the reception unit 20b receives the ultrasonic waves that have passed through the document 2. As is known, the multi-feed detector 20 detects whether or not the document 2 passing between the transmission unit 20a and the reception unit 20b is single-fed or multi-fed based on a degree of attenuation of the ultrasonic waves received by the reception unit 20b when the document 2 is passing between the transmission unit 20a and the reception unit 20b. The document detection sensor 21 and the edge sensor 19 are optical sensors. The document detection sensor 21 corresponds to a "document detector" that detects the document 2 at a position upstream of the reading unit 18.

Several embodiments of the image reading device 10 will be described below.

2. First Embodiment

Figure 3:
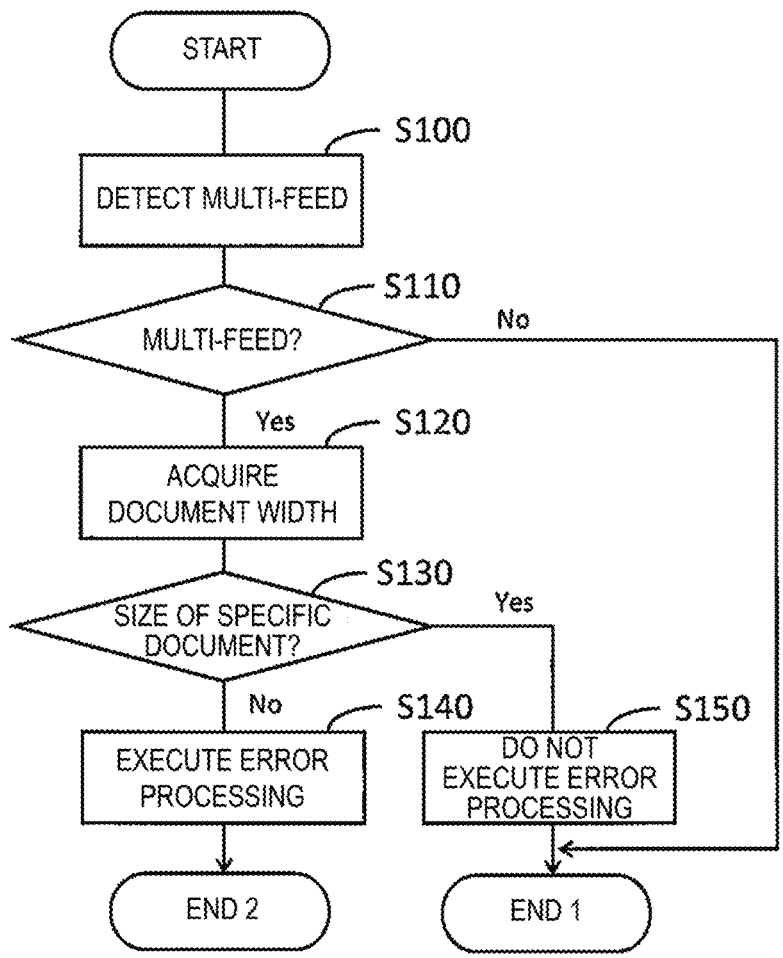
FIG. 3 is a flowchart illustrating multi-feed determination processing according to a first embodiment.

FIG. 3 illustrates, as a flowchart, multi-feed determination processing, according to a first embodiment, executed by the control unit 11 in accordance with the program 12. As an assumption for interpreting each flowchart in FIG. 3 and FIGS. 6, 7, and 9 described later, steps in the flowcharts are performed in parallel with a "transport step" of transporting the document 2 in the transport direction D1 and a "reading step" of reading the document 2 transported by the reading unit 18. The transport step and the reading step are not particularly illustrated in the flowcharts, but can be outlined as follows.

The user operates the operation reception unit 14 to instruct the image reading device 10 to start scanning of the document 2. Upon receiving the instruction to start the scanning, the control unit 11 determines whether or not the document 2 is present on the placement unit 3. Although omitted in illustration, the image reading device 10 includes a sensor that detects placement of the document 2 on the placement unit 3, in the vicinity of the placement unit 3. When the document 2 is detected by the sensor, the control unit 11 determines that the document 2 is present and starts the transport step and the reading step. On the other hand, when the sensor has not detected the document 2, the control unit 11 determines that the document 2 is not present and ends the processing.

The control unit 11 causes the transport unit 17 to perform processing of transporting one sheet of the document 2 from the placement unit 3, and causes the reading unit 18 to read the transported document 2. However, at this time, the multi-feed may occur. For example, when the detection, by the edge sensor 19 illustrated in FIG. 2, of the leading edge of the document 2 facing downstream is used as a trigger, the control unit 11 causes the reading unit 18 to start reading at a predetermined timing after the detection. As a result, image data is generated as a reading result of the document 2 when one surface is used as a unit, that is, when one page is used as a unit. The control unit 11 repeats such processing until it is determined that the document 2 is not present on the placement unit 3, unless the processing is stopped by error processing as described below. As a result, the control unit 11 can sequentially generate the image data, using one page as a unit, of a plurality of the documents 2 set on the placement unit 3, and can store the image data in the storage unit 15 or can transfer the image data to a predetermined external device via the communication IF 16.

At step S100, the control unit 11 causes the multi-feed detector 20 to start a multi-feed detection operation. The control unit 11 monitors a detection result by the multi-feed detector 20. The multi-feed detector 20 repeatedly executes multi-feed detection by comparing a signal received by the reception unit 20b with a predetermined threshold value while the document 2 is being transported by the transport unit 17. For example, when the multi-feed is continuously detected a predetermined number of times or more, or when the cumulative number of times of the multi-feed detection reaches a predetermined number of times, the multi-feed detector 20 determines that a condition of the multi-feed is satisfied and outputs a detection result indicating the multi-feed. On the other hand, when the condition is not satisfied, the multi-feed detector 20 outputs a detection result indicating the single-feed. A portion of the multi-feed detector 20 that performs such determination may be a portion of the control unit 11. Step S100 corresponds to "detecting a multi-feed" of detecting the multi-feed of the document 2 at a position upstream of the reading unit 18.

At step S110, when the multi-feed detector 20 has detected the multi-feed, the control unit 11 makes a "Yes" determination and proceeds to step S120. On the other hand, when the multi-feed detector 20 has detected the single-feed, the control unit 11 makes a "No" determination and ends the flowchart in FIG. 3. When the flowchart in FIG. 3 is ended as a result of the "No" determination at step S110 or as a result of "End 1" after going through step S150 described later, the control unit 11 starts the flowchart in FIG. 3 once again in response to the start of transport of the next document 2 by the transport unit 17. In other words, continuous reading of the plurality of documents 2 continues as it is. The processing after step S110 corresponds to a "control step" of the present embodiment.

At step S120, the control unit 11 acquires a "document width", which is the length of the document 2 in the width direction D2 intersecting the transport direction D1, from the image date generated by the reading unit 18 reading a leading end portion of the document 2. The intersection mentioned here may be understood to be orthogonal, as described above.

Figure 4:
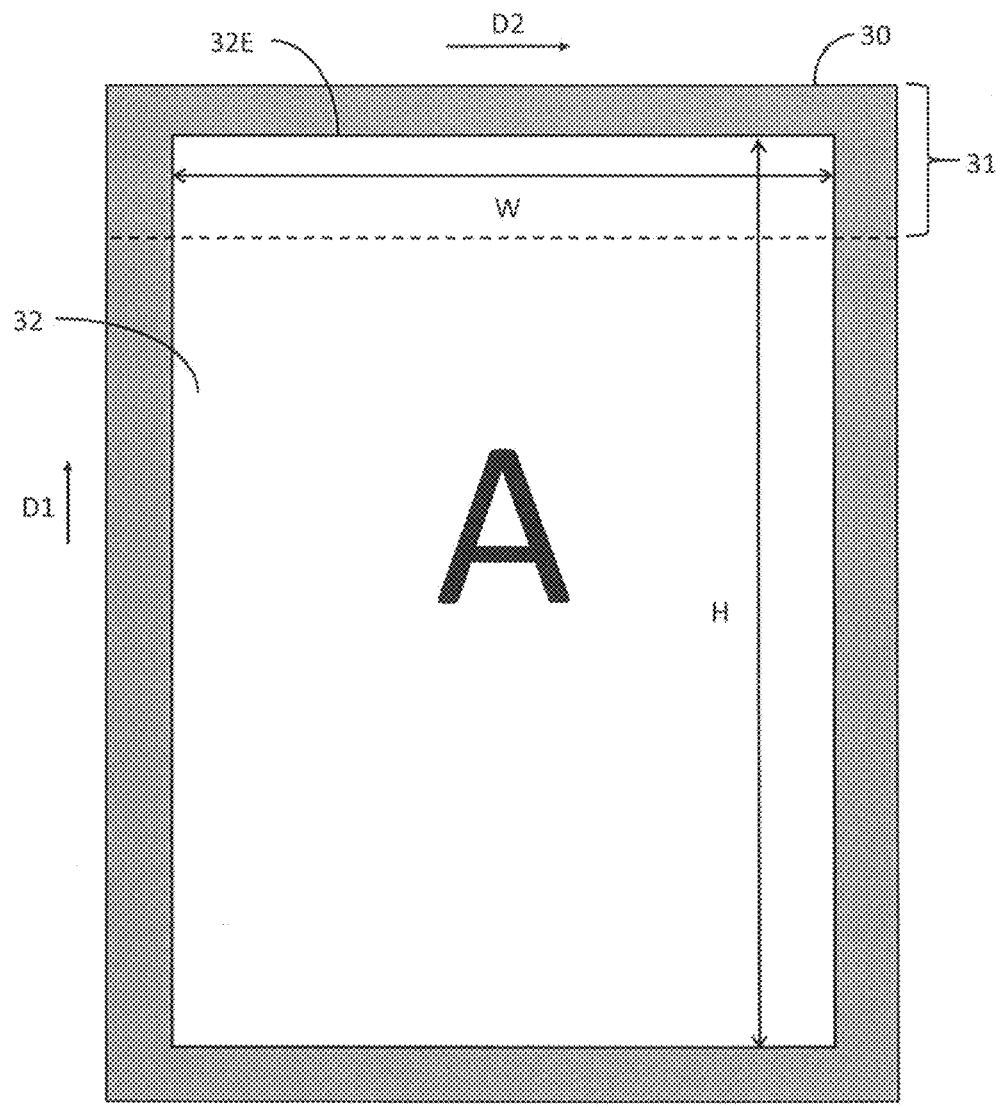
FIG. 4 is a diagram illustrating image data for one page of a document.

FIG. 4 illustrates image data 30 for one page generated by the reading step. In FIG. 4, a correspondence relationship between the image data 30 and the directions D1 and D2 is also illustrated. The image data 30 is formed by pixels being two-dimensionally arranged so as to correspond to the directions D1 and D2, respectively. Of the image data 30, a rectangular or substantially rectangular region indicated by a reference numeral 32 is a document region 32 corresponding to the reading result of the document 2 itself. Of the image data 30, a region indicated by a gray color outside the document region 32 corresponds to a result obtained by the image sensor of the reading unit 18 reading a so-called background plate. In this way, the reading unit 18 reads a range wider than the size of one page of the document 2 to generate the image data 30 for one page.

The image data generated by reading the leading end portion of the document 2 is a portion of the image data 30, and is referred to as leading end image data 31. The leading end image data 31 corresponds to a range including a leading edge 32E of the document region 32. In the present embodiment, with respect to the document 2, the image data 30, or a portion thereof, a downstream end portion is referred to as a "leading end", and an upstream end portion is referred to as a "trailing end". The range of the leading end image data 31 in the image data 30 need not necessarily be clearly defined. However, for example, a range corresponding to a predetermined number of lines from the leading end of the image data 30 is set to be the leading end image data 31, which is a range in which the leading edge 32E is almost certainly expected to be included.

The leading edge image data 31 is data generated at a timing at which reading of the predetermined number of lines is complete, subsequent to the start of the transport step and after the reading unit 18 has started the reading step. Thus, the control unit 11 can execute step S120 as soon as the leading end image data 31 is generated without waiting for the generation of the entire image data 30. The control unit 11 detects edges of the leading end image data 31, and identifies the document region 32 in the leading end image data 31 partitioned by the edges including the leading edge 32E. In general, an edge of an image is a position at which color or brightness suddenly changes. In the leading end image data 31, pixels located at positions at which the gray color of the background plate changes to the color of the document 2 itself form the edge partitioning the inside and outside of the document region 32. Since an edge detection method is known, a detailed description thereof is omitted here.

The control unit 11 acquires the length, in the width direction D2, of the document region 32 in the leading end image data 31 as a document width W. Note that, when the document 2 is transported while being inclined with respect to the transport direction D1, the document region 32 in which the leading edge 32E is inclined with respect to the width direction D2 is identified. Thus, when the document region 32 is inclined, the control unit 11 may acquire the document width W after performing rotation processing for correcting the inclination, on the document region 32 in the leading end image data 31. The document width W acquired in this way is either the long side or the short side of the document 2. In the example illustrated in FIG. 4, the document width W can be said to be the short side of the document 2, but the document width W may be the short side or the long side of the document 2 depending on the orientation of the document 2 when the user sets the document 2 on the placement unit 3.

At step S130, the control unit 11 determines whether or not the size of the document 2 corresponds to the size of a plastic card or an instant film based on the document width acquired at step S120. When it is determined that the size of the document 2 corresponds to the size of the plastic card or the instant film, the processing proceeds from a "Yes" determination at step S130 to step S150. On the other hand, when it is determined that the size of the document 2 does not correspond to the size of the plastic card or the instant film, the process proceeds from a "No" determination at step S130 to step S140.

The plastic cards are used as various cards such as an identification card, a membership card, and a patient registration card. Since the plastic card is thicker than a general paper sheet, the plastic card is a type of the document 2 which is likely to be erroneously detected as the multi-feed even when it is actually single-fed. The instant film is a film used for a so-called instant camera.

Figure 5:
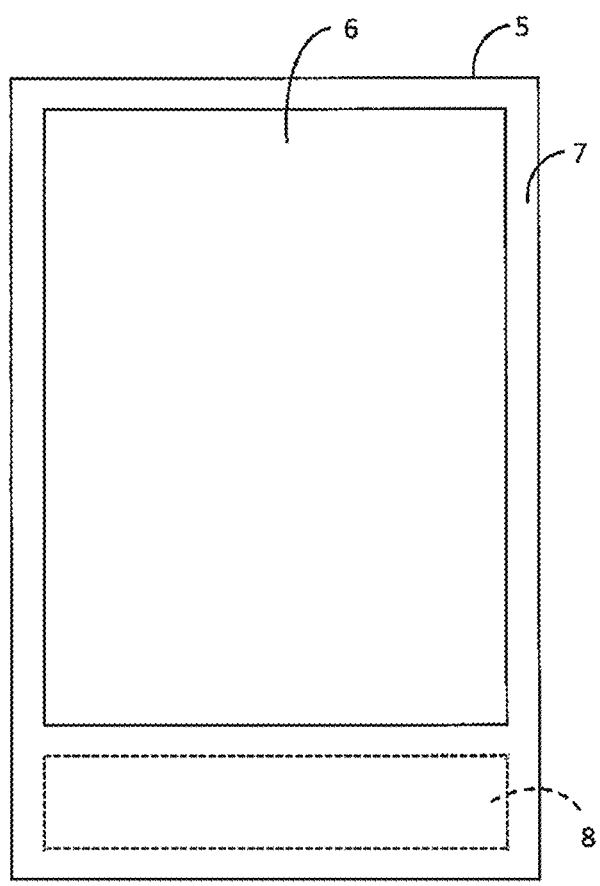
FIG. 5 is a diagram illustrating an instant film.

FIG. 5 illustrates an instant film 5. The instant film 5 is formed by a film 6 and a frame portion 7 around the film 6, and a chemical agent is sealed in a prescribed range 8 of the frame portion 7, as a result of its characteristics. A significant attenuation of ultrasonic waves occurs in the predetermined range 8 in which the chemical agent is enclosed. Therefore, the instant film is a type of the document 2 which is likely to be erroneously detected as the multi-feed even when it is actually single-fed. The plastic card and the instant film are collectively referred to as a "specific document".

The size of the plastic card is prescribed such that the long side×the short side=85.60 mm×53.98 mm and the thickness=0.76 mm, in accordance with the ISO/IEC 7810 ID-1 standard, for example. Also, as for the size of the instant film, based on the product standard, several sizes such as 86 mm×54 mm, 86 mm×72 mm, 108 mm×86 mm are prescribed as the long side×the short side. The control unit 11 has information in advance about the prescribed size of the specific document described above. Therefore, the control unit 11 determines whether or not a value obtained by converting the document width W into millimeters coincides with the length of any one of the long side and the short side prescribed for the specific document, and if the value coincides with any one of the long side and the short side, the control unit 11 makes the "Yes" determination at step S130. On the other hand, when the value obtained by converting the document width W into millimeters does not coincide with the length of any one of the long side and the short side prescribed for the specific document, the control unit 11 makes the "No" determination at step S130.

For example, if the document width W coincides with either 85.60 mm or 53.98 mm, it can be said that the size of the document 2 corresponds to the size of the plastic card, and thus, the "Yes" determination is made at step S130. Note that, in the present embodiment, "coinciding with" includes not only numerical values exactly coinciding with each other, but also a state in which the numerical values are close to each other within a predetermined allowable range, that is, a state in which the numerical values can be regarded as coinciding with each other.

At step S150, the control unit 11 ends the flowchart in FIG. 3 at "End 1" without executing "error processing" in response to an occurrence of the multi-feed. Since the error processing is not executed at step S150, no particular processing is performed at step S150, and the "Yes" determination at step S130 substantially results in "End 1" as it is. Proceeding to step S150 indicates that the multi-feed detection result by the multi-feed detector 20 has been erroneously issued, namely, that the single-feed of the specific document has been performed.

On the other hand, proceeding to step S140 indicates that the multi-feed detection result by the multi-feed detector 20 has been correct. At step S140, the control unit 11 executes the error processing and ends the flowchart in FIG. 3 at "End 2". The error processing includes stopping the transport of the document 2 by the transport unit 17. Specifically, the control unit 11 stops transport of the document 2 subsequent to the document 2 currently being transported by the transport unit 17. As the error processing, the control unit 11 may stop transport of the document 2 currently being transported, that is, the document 2 currently being multi-fed, or may continue the transport until the end and discharge the document 2 to the outside of the image reading device 10.

In the error processing, the control unit 11 may cause the display unit 13 to display a warning indicating that the multi-feed has occurred. As described above, when the flowchart in FIG. 3 ends at "End 2" with the error processing, the transport step and the reading step for the subsequent document 2 are not started until the user performs an error cancellation operation. The error cancellation operation is, for example, removal of the document 2 stopped in the middle of the transport path, input of an error cancellation instruction via the operation reception unit 14, or the like.

As described above, according to the first embodiment, even when the multi-feed detector 20 detects the multi-feed, the error processing is not executed simply on the basis of the multi-feed detection by the multi-feed detector 20, and once it is determined that the document is the specific document from the viewpoint of the size, it is possible to proceed to the transport and reading of the subsequent document 2 without executing the error processing. On the other hand, when the multi-feed detector 20 detects the multi-feed and the document is determined as a document other than the specific document from the viewpoint of the size, the error processing is executed.

3. Second Embodiment

Figure 6:
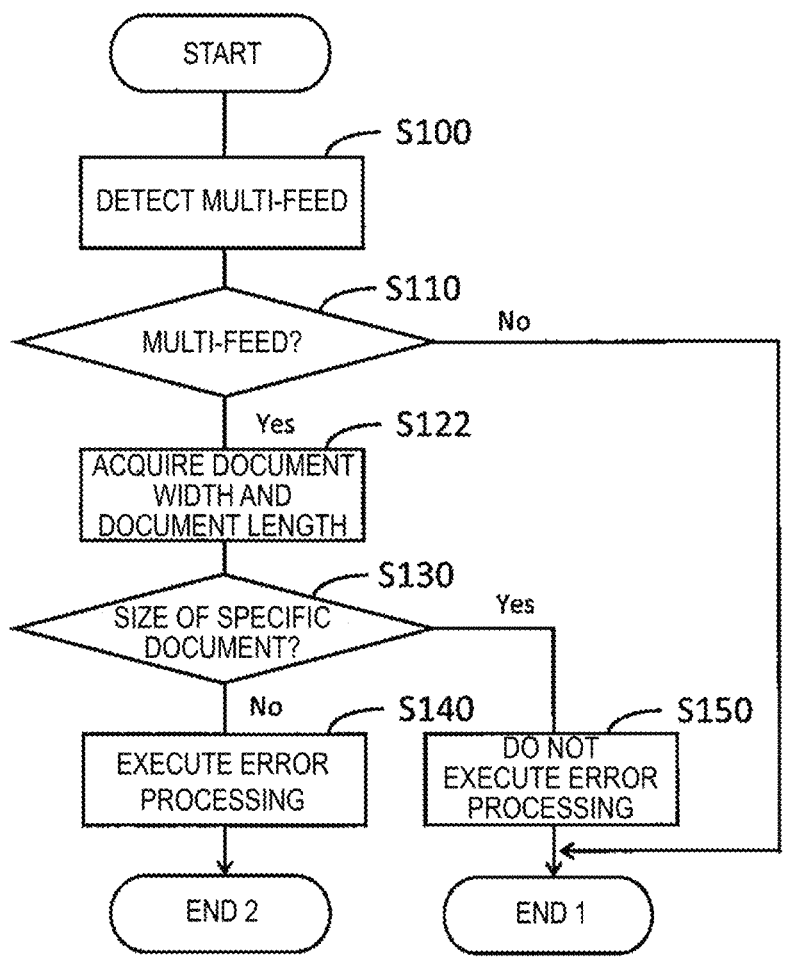
FIG. 6 is a flowchart illustrating multi-feed determination processing according to a second embodiment.

FIG. 6 illustrates, as a flowchart, multi-feed determination processing, according to a second embodiment, executed by the control unit 11 in accordance with the program 12. In the second embodiment, and in third and fourth embodiments described below, the same description as that of the first embodiment will be omitted. As can be understood by comparing FIG. 6 with FIG. 3, in the second embodiment, step S122 is performed instead of step S120. At step S122, the control unit 11 acquires a "document length", which is the length of the document 2 in the transport direction D1, as well as acquiring the document width in the same manner as at step S120.

First and second document length acquisition methods will be presented here as a document length acquisition method. The control unit 11 may acquire the document length by using either of the methods.

First Document Length Acquisition Method

The control unit 11 can acquire the document length based on the detection result of the document 2 by the document detection sensor 21. The document detection sensor 21 outputs an ON signal in a state in which the document 2 is being detected, and outputs an OFF signal in a state in which the document 2 cannot be detected. Further, the transport speed of the document 2 by the transport unit 17 is known. Thus, it is sufficient that the control unit 11 acquires, as the document length, a transport distance of the document 2 corresponding to a time period from when the output of the document detection sensor 21 switches from the OFF signal to the ON signal to when the document detection sensor 21 once more switches to the OFF signal, after the transport of the document 2 from the placement unit 3 by the transport unit 17 has been started, namely, corresponding to a time period over which the ON signal is continuously output.

Second Document Length Acquisition Method

The control unit 11 acquires the document length from the image data 30 generated by the reading unit 18 reading the document 2. In other words, the control unit 11 identifies the document region 32 in the image date 30, and acquires the length of the document region 32 in the transport direction D1 as a document length H. FIG. 4 illustrates the document length H acquired by the second document length acquisition method. Note that, when the second document length acquisition method is employed, the control unit 11 acquires the document length after the generation of the image data 30 for one page is completed.

As a result of step S122, the lengths of the long side and the short side of the document 2 are determined.

At step S130, the control unit 11 determines whether or not the size of the document 2 corresponds to the size of the plastic card or the instant film based on the document width and the document length acquired at step S122. In other words, if the size of a rectangle identified by the acquired document width and document length coincides with any one of the prescribed sizes of the specific document as described above, the "Yes" determination is made at step S130. On the other hand, if the size of the rectangle identified by the acquired document width and document length does not coincide with any of the prescribed sizes of the specific document, the "No" determination is made at step S130. In the second embodiment, upon determining whether or not the size of the document 2 corresponds to the size of the specific document, by taking into account not only the document width but also the document length, it is possible to further increase the accuracy of determining that the document 2 is the specific document.

4. Third Embodiment

Figure 7:
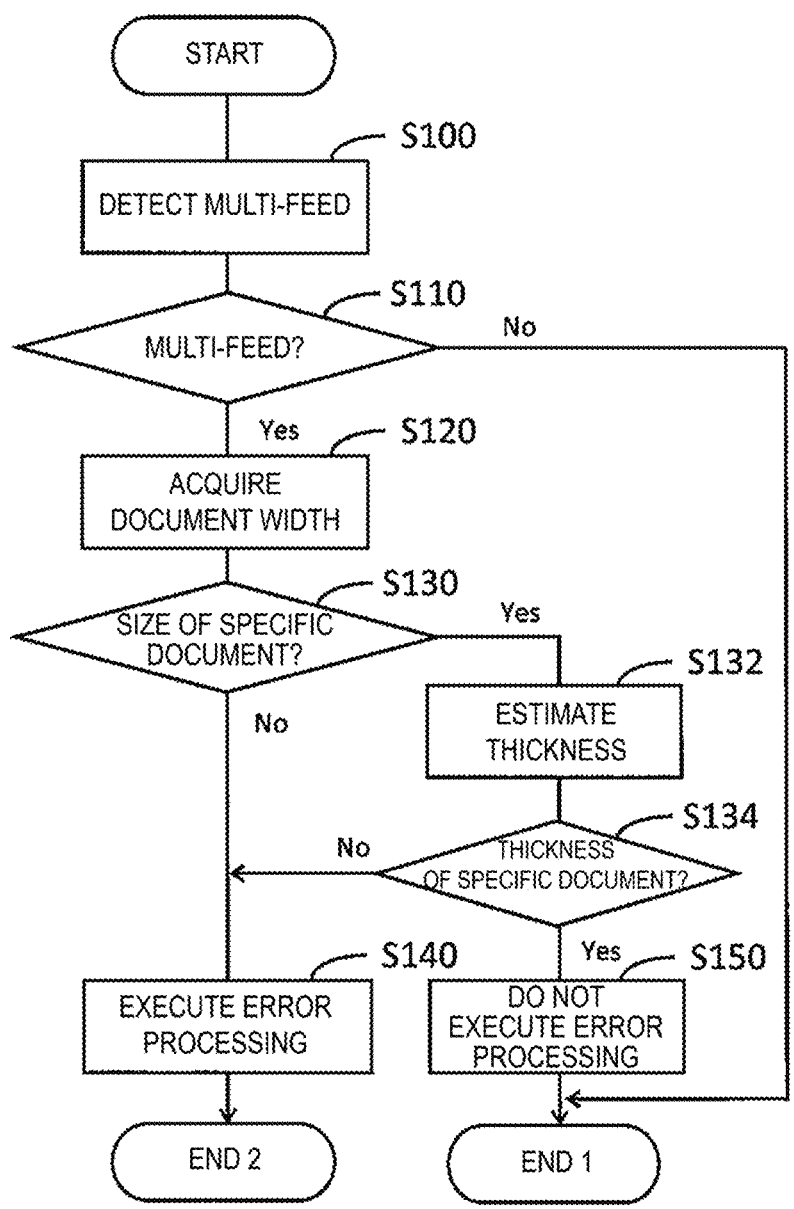
FIG. 7 is a flowchart illustrating multi-feed determination processing according to a third embodiment.

FIG. 7 illustrates, as a flowchart, multi-feed determination processing, according to a third embodiment, executed by the control unit 11 in accordance with the program 12. As can be understood by comparing FIG. 7 with FIG. 3, in the third embodiment, steps S132 and S134 are included as steps after the "Yes" determination at step S130. Also in the third embodiment, the determination at step S130 may be performed by executing step S122 instead of step S120.

The control unit 11 can estimate the thickness of the document 2 based on a pixel value of a darkest portion among the pixel values of the image data 30 corresponding to a shadow of the document 2 appearing on the background plate serving as the background of the document 2. At step S132, such estimation of the thickness is performed. The image data used for estimating the thickness may be a portion of the image data 30, or may be the leading end image data 31 including the leading edge 32E.

Figure 8:
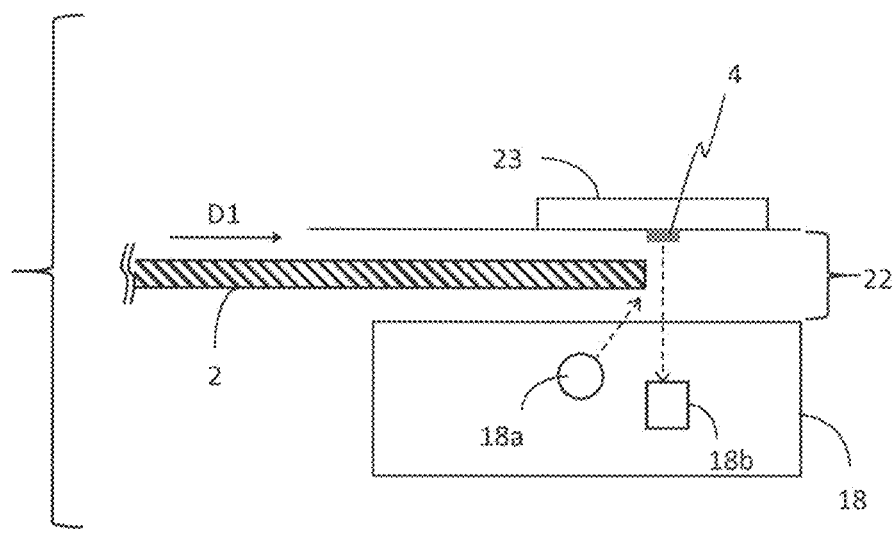
FIG. 8 is a diagram illustrating a configuration including a portion of a transport path and a portion of a reading unit in a simplified manner.

FIG. 8 illustrates a configuration including a portion of the transport path 22 and a portion of the reading unit 18 in the image reading device 10 from the same viewpoint as that of FIG. 2, in a simplified manner. In FIG. 8, the transport direction D1 is simply the horizontal direction. A portion of the reading unit 18 located below the transport path 22 includes a light source 18a and an image sensor 18b as a configuration for reading the lower surface of the document 2. A background plate 23 is provided at a position facing the image sensor 18b with the transport path 22 sandwiched therebetween.

According to FIG. 8, the light source 18a is located upstream of the image sensor 18b, and light irradiated from the light source 18a generates a shadow 4 at a position of the background plate 23 provided downstream of the leading end of the document 2. The color of the shadow 4 is darker than the color of the background plate 23. The length of the shadow 4 is proportional to the thickness of the document 2 at an image capturing position of the image sensor 18b. Further, there is a tendency that the thicker the document 2, the longer the shadow 4 and the darker the color of the shadow 4. This is because it is presumed that the thicker the document 2, the less light is transmitted through the document 2, and as a result, the darker the shadow 4 of the document 2 generated on the background plate 23 also becomes.

Thus, the control unit 11 identifies the pixel value of the darkest portion among the pixel values corresponding to the shadow 4 of the leading end of the document region 32, from a region outside the document region 32 in the leading end image data 31. As a result, the thickness of the document 2 can be estimated based on the pixel value of the shadow 4 read by the reading unit 18. Note that thickness estimation processing based on the pixel value of the shadow is described in detail in JP-A-2018-195960.

At step S134, the control unit 11 compares the thickness estimated at step S132 with a predetermined threshold value to determine whether or not the thickness is the thickness of the specific document. The threshold value used for the determination at step S134 is a value for distinguishing between the thickness of the specific document and a thickness thinner than that of the specific document. Here, when the estimated thickness is equal to or greater than the threshold value, a "Yes" determination is made at step S134 and the processing proceeds to step S150, and when the estimated thickness is less than the threshold value, a "No" determination is made at step S134 and the processing proceeds to step S140. As described above, in the third embodiment, when the multi-feed detector 20 has detected the multi-feed of the document 2, the control unit 11 uses the fact that the estimated thickness of the document 2 is equal to or greater than the predetermined threshold value, as one of conditions for not executing the error processing.

Note that the execution order of the determination at step S130 and the determination at step S134 may be reversed. In other words, the control unit 11 may proceed to step S134 after making the "Yes" determination at step S134, and then may make the "Yes" determination at step S130. In the third embodiment as described above, by also taking into account the thickness of the document 2 in addition to the determination of whether or not the document 2 corresponds to the size of the specific document, it is possible to further increase the accuracy of determining that the document 2 is the specific document.

As described above, the plastic card has the thickness of 0.76 mm, which is thicker than the thickness of a general document. Therefore, the threshold value used at step S134 may be set to an appropriate value for distinguishing the above-described thickness of the plastic card from a thickness that is thinner than that of the plastic card. As a result, in a usage environment of the image reading device 10 in which the plastic card is read as the specific document, it is possible to reliably avoid a situation in which the single-feed of the plastic card is erroneously detected as the multi-feed and the error processing is performed on the plastic card.

5. Fourth Embodiment

Figure 9:
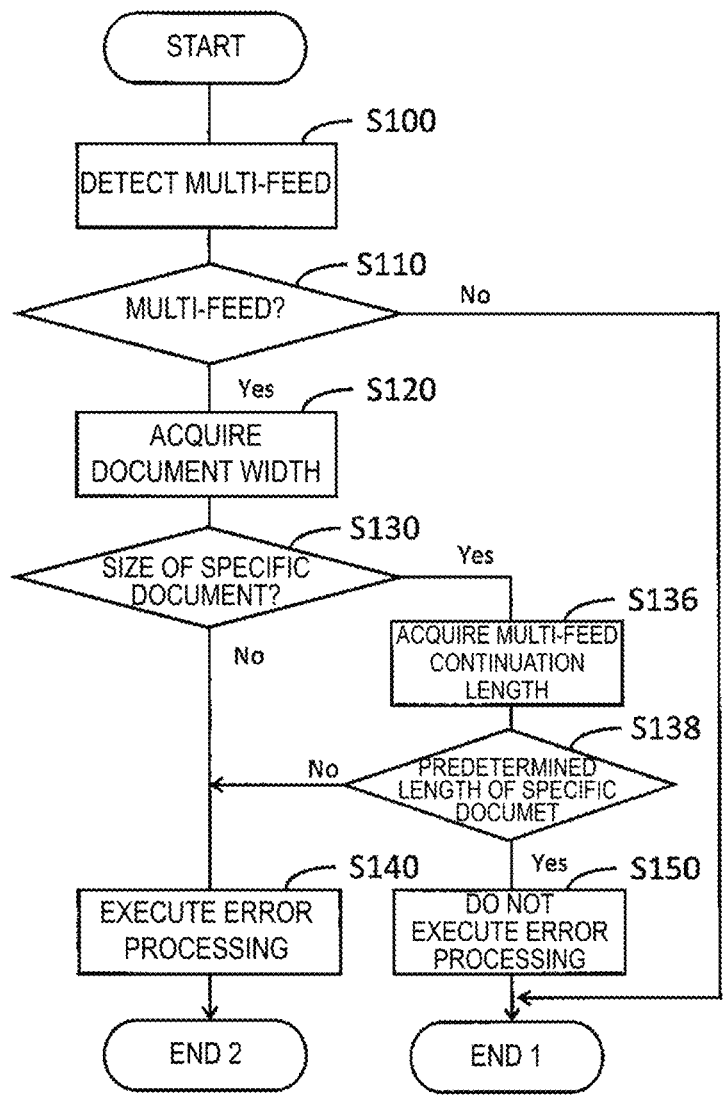
FIG. 9 is a flowchart illustrating multi-feed determination processing according to a fourth embodiment.

FIG. 9 illustrates, as a flowchart, multi-feed determination processing, according to a fourth embodiment, executed by the control unit 11 in accordance with the program 12. As can be understood by comparing FIG. 9 with FIG. 3, in the fourth embodiment, steps S136 and S138 are included as steps after the "Yes" determination at step S130. Also in the fourth embodiment, the determination at step S130 may be performed by executing step S122 instead of step S120. In addition, the above-described determination based on the thickness at step S134 may be further added to the fourth embodiment.

At step S136, the control unit 11 acquires a transport distance, by the transport unit 17, corresponding to a time period in which the multi-feed of the document 2 is continuously detected by the multi-feed detector 20. This transport distance will be referred to as a "multi-feed continuation length" below.

Figure 10:
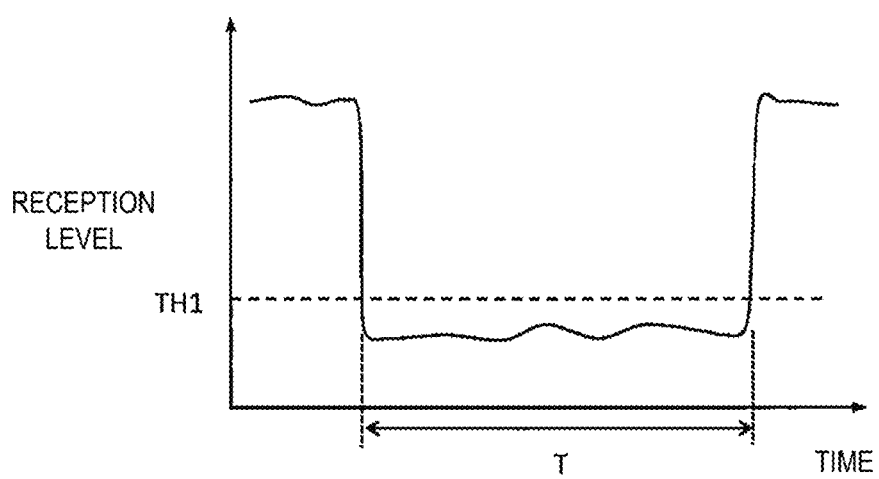
FIG. 10 is a diagram illustrating, as a graph, changes in a reception level at a reception unit.

FIG. 10 illustrates, as a graph, changes caused by the transport of the document 2 at the transport step, in the reception level of a signal received by the reception unit 20b of the multi-feed detector 20, with the horizontal axis representing time and the vertical axis representing the reception level. A threshold value TH1 is a predetermined threshold value used by the multi-feed detector 20 to be compared with the reception level of the reception unit 20b. The multi-feed detector 20 determines, as the multi-feed, a state in which the reception level is equal to or lower than the threshold value TH1. Note that the reception level illustrated in FIG. 10 may be a value obtained by converting the signal received by the reception unit 20b as necessary, in order to compare the value with the threshold value TH1. In the example illustrated in FIG. 10, the duration of a time period in which the reception level is continuously kept equal to or lower than the threshold value TH1 is indicated as a period T.

Therefore, according to the example illustrated in FIG. 10, the control unit 11 can acquire the multi-feed continuation length by multiplying the period T by the transport speed of the transport unit 17.

At step S138, the control unit 11 determines whether or not the multi-feed continuation length acquired at step S136 coincides with a predetermined length of the plastic card or the instant film. In other words, when the multi-feed continuation length coincides with any one of the predetermined lengths of the specific document, a "Yes" determination is made at step S138 and the processing proceeds to step S150, and when the multi-feed continuation length does not coincide with any of the predetermined lengths of the specific document, a "No" determination is made at step S138 and the processing proceeds to step S140.

The predetermined lengths of the specific document used for the determination at step S138 correspond to the prescribed lengths of the long side and the short side of the plastic card described above. Further, with respect to the instant film, the lengths of the long side and the short side of the predetermined range 8, in which the chemical agent is enclosed as illustrated in FIG. 5, correspond to the predetermined lengths of the specific document. In the present embodiment, it is assumed that the control unit 11 also has information in advance about the lengths of the long side and the short side of the predetermined range in which the chemical agent is enclosed, for various types of the instant film.

As described above, in the fourth embodiment, when the multi-feed detector 20 has detected the multi-feed of the document 2, the control unit 11 uses the fact that the multi-feed continuation length coincides with the predetermined length of the specific document, as one of the conditions for not executing the error processing. Also in the fourth embodiment, the execution order of the determination at step S130 and the determination at step S138 may be reversed. In the fourth embodiment, in addition to the determination of whether or not the document 2 corresponds to the size of the specific document, by taking into account the multi-feed continuation length, it is possible to further improve the accuracy of determining that the document 2 is the specific document.

6. Conclusion

As described above, according to the present embodiment, the image reading device 10 includes the transport unit 17 that transports the document 2 in the predetermined transport direction D1, the reading unit 18 that reads the document 2 transported by the transport unit 17, the multi-feed detector 20 that is provided at the position upstream of the reading unit 18 in the transport direction D1 and detects the multi-feed of the document 2, and the control unit 11. When the multi-feed detector 20 detects the multi-feed of the document 2, the control unit 11 acquires the document width, which is the length of the document 2 in the width direction D2 intersecting the transport direction D1, from the image data (leading end image data 31) generated by the reading unit 18 reading the leading end portion of the document 2, and determines whether or not the size of the document 2 corresponds to the size of the plastic card or the instant film based on the document width. When the control unit 11 determines that the size of the document 2 corresponds to the size of the plastic card or the instant film, the control unit 11 does not execute the error processing in response to the occurrence of the multi-feed, and when the control unit 11 determines that the size of the document 2 does not correspond to the size of the plastic card or the instant film, the control unit 11 executes the error processing.

According to the above-described configuration, when the multi-feed detector 20 has detected the multi-feed, the image reading device 10 further determines whether or not the size of the document 2 corresponds to the specific document such as the plastic card and the instant film based on the document width. Then, when it can be determined that the document corresponds to the specific document, the control unit 11 does not execute the error processing, and when it can be determined that the document does not correspond to the specific document, the control unit 11 executes the error processing. Therefore, when the multi-feed is erroneously detected by the multi-feed detector 20 despite the fact that the specific document has actually been single-fed, it is possible to avoid stopping the function of the multi-feed detector 20, or to avoid executing the error processing. As described above, since the accuracy of determining the multi-feed or the single-feed is comprehensively improved by taking into account the specific document that is likely to be erroneously detected as the multi-feed, it is possible to smoothly transition to the transport and reading of the subsequent document 2, and as a result, the operational efficiency and convenience for the user are improved.

Further, when the multi-feed detector 20 detects the multi-feed, the image reading device 10 acquires the document width from the leading end image data 31, and determines whether or not the size of the document 2 corresponds to the specific document. Therefore, when the error processing is executed as a result, the error processing can be executed at a relatively early timing, that is, at a timing at which the reading of the document 2 has not yet been completed, and wasted time for the user can be reduced as much as possible.

According to the present embodiment, the control unit 11 can estimate the thickness of the document 2 based on the pixel value of the darkest portion among the pixel values, of the leading end image data 31, corresponding to the shadow 4 of the document 2 appearing on the background plate 23 serving as the background of the document 2. Then, when the multi-feed detector 20 detects the multi-feed of the document 2, the control portion 11 may use the fact that the thickness is equal to or greater than the predetermined threshold value, as one of the conditions for not executing the error processing.

According to the above-described configuration, by adding the determination of the thickness of the document 2, it is possible to further increase the accuracy of determining whether or not the document 2 corresponds to the specific document, and also to increase the feasibility of realizing the feature of not executing the error processing when the document 2 is the specific document, even when the multi-feed detector 20 has detected the multi-feed.

Further, according to the present embodiment, the image reading device 10 includes the document detector that is provided at the position upstream of the reading unit 18 in the transport direction D1 and detects the document 2. Then, the control unit 11 may acquire the document length, which is the length of the document in the transport direction D1, based on the detection result of the document 2 by the document detector, and, when the multi-feed detector 20 detects the multi-feed of the document 2, the control unit 11 may determine whether or not the size of the document 2 corresponds to the size of the plastic card or the instant film based on the document width and the document length.

According to the above-described configuration, by understanding the size of the document 2 based on the document length in addition to the document width, it is possible to further improve the accuracy of determining whether or not the document 2 corresponds to the specific document, and also to improve the feasibility of realizing the feature of not executing the error processing when the document 2 is the specific document, even when the multi-feed detector 20 has detected the multi-feed. Further, by acquiring the document length from the detection result by the document detector located upstream of the reading unit 18, it is possible to determine whether or not to perform the error processing at the timing at which the reading of the document 2 has not yet been completed.

Further, according to the present embodiment, when the multi-feed detector 20 detects the multi-feed of the document 2, the control unit 11 may acquire the document length, which is the length of the document 2 in the transport direction D1, from the image data 30 generated by the reading unit 18 reading the document 2, and may determine whether or not the size of the document 2 corresponds to the size of the plastic card or the instant film based on the document width and the document length.

According to the above-described configuration, by understanding the size of the document 2 based on the document length in addition to the document width, it is possible to further improve the accuracy of determining whether or not the document 2 corresponds to the specific document, and also to improve the feasibility of realizing the feature of not executing the error processing when the document 2 is the specific document, even when the multi-feed detector 20 has detected the multi-feed.

Further, according to the present embodiment, when the multi-feed detector 20 has detected the multi-feed of the document 2, the control unit 11 may use, as one of the conditions for not executing the error processing, the fact that the transport distance by the transport unit 17 corresponding to the time period in which the multi-feed has been continuously detected, that is, the fact that the multi-feed continuation length coincides with the predetermined length of the plastic card or the instant film.

According to the above-described configuration, by adding the determination on the multi-feed continuation length, it is possible to further improve the accuracy of determining whether or not the document 2 corresponds to the specific document, and also to improve the feasibility of realizing the feature of not executing the error processing when the document 2 is the specific document, even when the multi-feed detector 20 has detected the multi-feed.

As a modified example of the fourth embodiment, a configuration can be adopted in which steps S120 and S130 are omitted from the flowchart in FIG. 9. The control unit 11 may proceed from the "Yes" determination at step S110 to step S136. In other words, when the multi-feed detector 20 detects the multi-feed of the document 2, the control unit 11 determines whether or not the transport distance by the transport unit 17, corresponding to the time period in which the multi-feed has been continuously detected, corresponds to the predetermined length of the plastic card or the instant film. When the control unit 11 determines that the transport distance coincides with the predetermined length of the plastic card or the instant film, the control unit 11 does not execute the error processing, and when the control unit 11 determines that the control unit 11 determines that the transport distance does not coincide with the predetermined length of the plastic card or the instant film, the control unit 11 executes the error processing.

As in the related art, even when the degree of roundness at the corner of the medium is detected in order to determine whether or not the medium is the plastic card based on the degree of roundness, there is a risk that a paper sheet having the same shape as that of the plastic card may be erroneously determined as the plastic card. On the other hand, as in the present embodiment, by taking into account the thickness of the document 2 and the multi-feed continuation length when making the determination, it is possible to further reduce the risk that the medium, which is not the plastic card, is erroneously determined as the plastic card.

Note that, in the scope of the claims, only some of the combinations of the claims are described. However, as a matter of course, the present embodiment includes various combinations of the plurality of dependent claims, as well as one-to-one combinations of the independent claims and the dependent claims.

In addition to the image reading device 10, the present embodiment discloses the image reading method and the program 12 for executing the method in collaboration with the processor. In other words, the image reading method includes the transport step of transporting the document 2 in the predetermined transport direction D1, the reading step of reading the transported document 2 by the reading unit 18, the multi-feed detection step of detecting the multi-feed of the document 2 at the position upstream of the reading unit 18 in the transport direction D1, and the control step. At the control step, when the multi-feed of the document 2 is detected at the multi-feed detection step, the document width, which is the length of the document 2 in the width direction D2 intersecting the transport direction D1, is acquired from the image data (leading end image data 31) generated by the reading unit 18 reading the leading end portion of the document 2, and it is determined whether or not the size of the document 2 corresponds to the size of the plastic card or the instant film based on the document width. When it is determined that the size of the document 2 corresponds to the size of the plastic card or the instant film, the error processing in response to the occurrence of the multi-feed is not executed, and when it is determined that the size of the document 2 does not correspond to the size of the plastic card or the instant film, the error processing is executed.

7. Fifth Embodiment

As described above, the multi-feed detector 20 includes the transmission unit 20a that transmits the ultrasonic waves and the reception unit 20b that receives the ultrasonic waves.

In any of the first to fourth embodiments and each of application examples to be described below, when the multi-feed detector 20 detects the multi-feed of the document 2 and the error processing is not executed, the control unit 11 may increase the transmission level of the ultrasonic waves transmitted by the transmission unit 20a to a higher value than the present value. The case in which the multi-feed of the document 2 is detected and the error processing is not executed refers to the case in which the processing proceeds to step S150.

Figure 11:
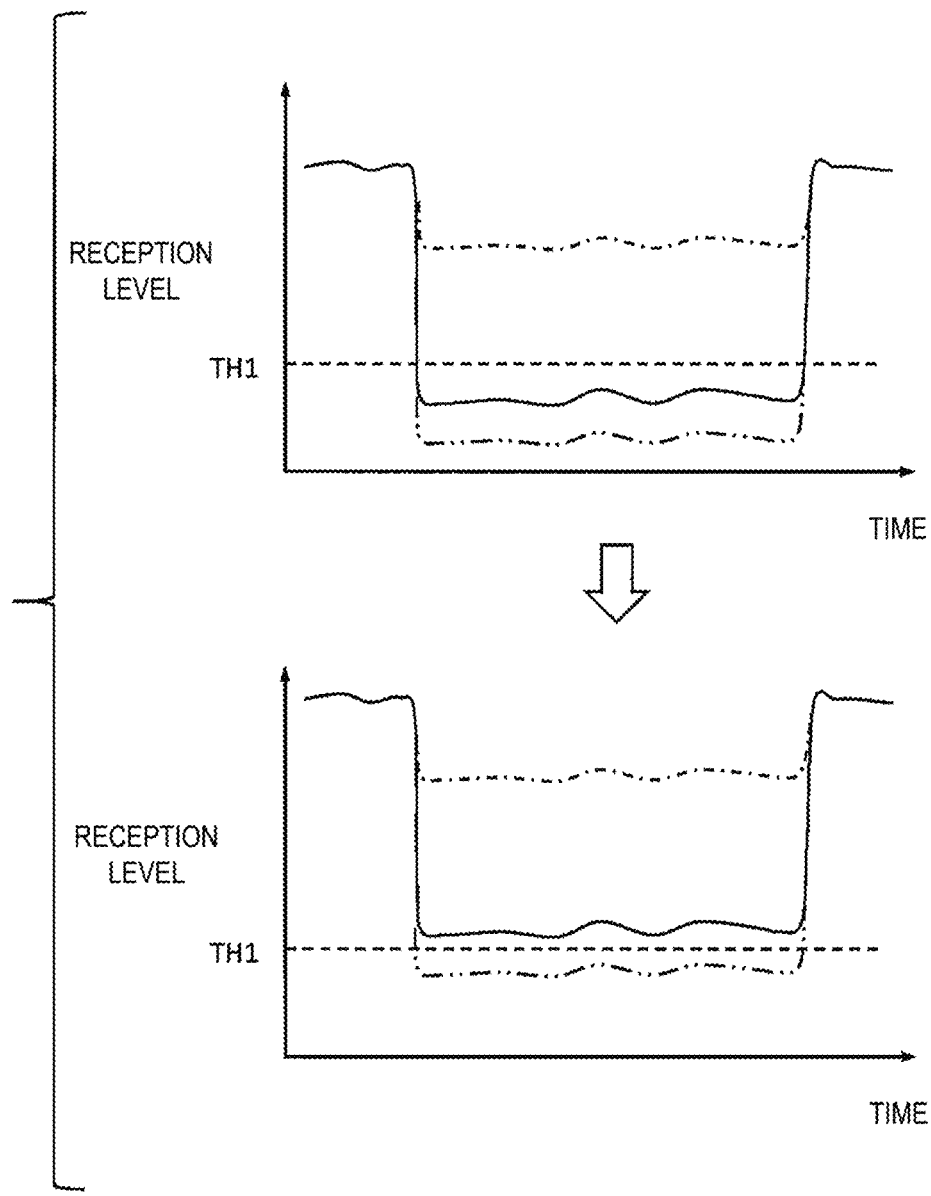
FIG. 11 is a diagram illustrating, for the purpose of comparison, the reception levels before and after a transmission level is increased, using graphs.

FIG. 11 is a diagram for describing an effect of the fifth embodiment, and, in the same manner as in FIG. 10, illustrates, as a graph, changes in the reception level at the reception unit 20b of the multi-feed detector 20. The upper part of FIG. 11 illustrates a state before the transmission level is increased, and the lower part of FIG. 11 illustrates a state after the transmission level is increased. Further, in FIG. 11, the reception level at a time when the plastic card is being single-fed is indicated by a solid line, the reception level at a time when a plain paper sheet is being single-fed is indicated by a one-dot chain line, and the reception level at a time when the plain paper sheet is being multi-fed is indicated by a two-dot chain line. Note that, since the size of the plastic card is different from the size of the plain paper sheet, it naturally takes different time periods for the plastic card and the plain paper sheet to pass between the transmission unit 20a and the reception unit 20b. However, in FIG. 11, such a difference in the length of the time period is ignored, and only the difference in the reception level is illustrated for ease of understanding.

According to the upper part of FIG. 11, although not as much as when the plain paper sheet is multi-fed, when the plastic card is single-fed, the reception level also drops significantly and becomes lower than the threshold value TH1. Therefore, when the plastic card is single-fed, the "Yes" determination is made at step S110, and then the processing proceeds to step S150. In the fifth embodiment, in such a case, the transmission level of the ultrasonic waves by the transmission unit 20a is increased to a higher value than the present value. That is, the output of the transmission unit 20a is increased. As a result, the reception level at the reception unit 20b increases as a whole, and as illustrated in the lower part of FIG. 11, the reception level can be made to be lower than the threshold value TH1 when the plain paper sheet is multi-fed, and made to be higher than the threshold value TH1 when the plastic card is single-fed. Thus, after transporting the subsequent document 2, it is possible to suppress the erroneous detection of the multi-feed.

8. Other Descriptions

As described above, the error processing includes stopping the transport by the transport unit 17. Here, the control unit 11 can execute, as a control of the transport unit 17, a "first transport control" of starting transport of the (n+1)-th document 2 after completing reading of the n-th document 2 by the reading unit 18, or a "second transport control" of starting the transport of the (n+1)-th document 2 before completing the reading of the n-th document 2 by the reading unit 18. n is an integer equal to or greater than 1. Which one of the first transport control and the second transport control is executed depends on a setting by the user, for example.

When the document 2 transported at a certain transport step is regarded as the n-th document 2, the document 2 subsequent to the n-th document 2 is the (n+1)-th document 2. Further, regardless of whether the n-th document 2 is actually single-fed or multi-fed, the document 2 to be transported subsequently to the n-th document 2 is interpreted as the (n+1)-th document 2. For example, even when the document 2 transported as the n-th document is actually in a multi-fed state in which two sheets of the document 2 overlap each other, the document 2 to be transported subsequently to the multi-fed document 2 is regarded as the (n+1)-th document 2 instead of the (n+2)-th document 2.

In the first transport control, the control unit 11 causes the transport unit 17 to start the transport of the (n+1)-th document 2, for example, after the trailing end of the n-th document 2 passes through the reading unit 18. On the other hand, in the second transport control, the control unit 11 causes the transport unit 17 to start the transport of the (n+1)-th document 2 while the n-th document 2 is still being read by the reading unit 18. Therefore, the interval between the documents 2 that are consecutively transported is narrower in the second transport control than in the first transport control.

First Application Example

A relationship between the first transport control and the present embodiment will be described. When the multi-feed detector 20 detects the multi-feed of the n-th document 2, upon determining that the size of the n-th document 2 corresponds to the size of the plastic card or the instant film, that is, the size of the specific document, the control unit 11 performing the first transport control causes the transport unit 17 to start the transport of the (n+1)-th document 2 after the reading unit 18 completes the reading of the n-th document 2. On the other hand, when the multi-feed detector 20 detects the multi-feed of the n-th document 2, upon determining that the size of the n-th document 2 does not correspond to any size of the specific document, the control unit 11 stops the transport of the (n+1)-th document 2 by the transport unit 17 as the error processing. In other words, the control unit 11 does not start the transport of the (n+1)-th document 2 by the transport unit 17

Based on each of the above-described embodiments, "upon determining that the size of the n-th document 2 corresponds to the size of the specific document" can be rephrased as "when the processing proceeds to step S150", and "upon determining that the size of the n-th document 2 does not correspond to any size of the specific document" can be rephrased as "when the processing proceeds to step S140". When stopping the transport of the (n+1)-th document 2 by the transport unit 17, the control unit 11 may stop the transport of the n-th document 2 on the spot as described above, or may continue the transport and discharge the n-th document 2 to the outside of the image reading device 10.

Second Application Example

A relationship between the second transport control and the present embodiment will be described. With respect to the second application example and a third application example to be described below, the same description as that of the first application example will be omitted. When the multi-feed detector 20 detects the multi-feed of the n-th document 2, the control unit 11 performing the second transport control suspends the start of transport of the (n+1)-th document 2 until the control unit 11 determines whether or not the size of the n-th document 2 corresponds to the size of the plastic card or the instant film, that is, the size of the specific document. In other words, in the second transport control, even at a timing at which the transport of the (n+1)-th document 2 can be started, when it is not yet determined whether to proceed to step S140 or S150 at that time, the start of the transport of the (n+1)-th document 2 is suspended until the determination is made.

Then, upon determining that the size of the n-th document 2 corresponds to the size of the specific document, the control unit 11 causes the transport unit 17 to start the transport of the (n+1)-th document 2 before the reading unit 18 completes the reading of the n-th document 2. On the other hand, upon determining that the size of the n-th document 2 does not correspond to any size of the specific document, the control unit 11 stops the transport of the (n+1)-th document 2 by the transport unit 17 as the error processing.

Note that, according to the second document length acquisition method described in the second embodiment, in order to acquire the document length, reading of the n-th document 2 needs to be completed. Thus, when the second document length acquisition method is adopted in the second embodiment, the second application example or the third application example to be described below cannot be combined with the second embodiment.

Third Application Example

Also in the third application example, the relationship between the second transport control and the present embodiment will be described. When the multi-feed detector 20 detects the multi-feed of the n-th document 2, upon determining that the size of the n-th document 2 corresponds to the size of the plastic card or the instant film, that is, the size of the specific document, the control unit 11 performing the second transport control may start transport of the (n+2)-th document 2 by the transport unit 17, and upon determining that the size of the n-th document 2 does not correspond to any size of the specific document, the control unit 11 may stop the transport of the (n+2)-th document 2 by the transport unit 17 as the error processing.

In other words, in the second application example, the start of transport of the (n+1)-th document 2 is suspended until it is determined whether or not the size of the n-th document 2 corresponds to the size of the specific document, but in the third application example, such suspension is not performed. Since the suspension is not performed, in the third application example, the transport of the (n+1)-th document 2 has already been started at the time when the multi-feed of the n-th document 2 is detected by the multi-feed detector 20 and it is determined that the size of the n-th document 2 corresponds/does not correspond to the size of the specific document. Therefore, when the control unit 11 determines that the size of the n-th document 2 corresponds/does not correspond to the size of the specific document, the control unit 11 starts or stops (does not start) the transport of the (n+2)-th document 2, which is the document 2 subsequent to the (n+1)-th document 2 that is already being transported. Of course, when stopping the transport of the (n+2)-th document 2 by the transport unit 17 as the error processing, the control unit 11 may stop the transport of the n-th and (n+1)-th documents 2 on the spot, or may continue the transport and discharge the documents 2 to the outside of the image reading device 10.

Each of the application examples described above also produces effects similar to those in the above-described embodiments.

What is claimed is:
1. An image reading device comprising:
 a transport unit configured to transport a document in a predetermined transport direction;
 a reading unit configured to read the document transported by the transport unit;

a multi-feed detector provided at a position upstream of the reading unit in the transport direction and configured to detect a multi-feed of the document; and a control unit, wherein when the multi-feed detector detects the multi-feed of the document, the control unit acquires a document width from image data generated by the reading unit reading a leading end portion of the document, the document width being a length of the document in a width direction intersecting the transport direction, determines, based on the document width, whether a size of the document corresponds to a size of a plastic card or an instant film, does not execute error processing in response to an occurrence of the multi-feed when it is determined that the size of the document corresponds to the size of the plastic card or the instant film, and executes the error processing when it is determined that the size of the document does not correspond to the size of the plastic card or the instant film.

2. The image reading device according to claim 1, wherein the control unit is configured to estimate a thickness of the document based on a pixel value of a darkest portion among the pixel values of the image data, the pixel values corresponding to a shadow of the document appearing on a background plate serving as a background of the document, and when the multi-feed detector detects the multi-feed of the document, the control unit sets the thickness equal to or greater than a predetermined threshold value as one of conditions for not executing the error processing.

3. The image reading device according to claim 1, comprising a document detector provided at a position upstream of the reading unit in the transport direction and configured to detect the document, wherein the control unit is configured to acquire a document length based on a detection result of the document by the document detector, the document length being a length of the document in the transport direction, and when the multi-feed detector detects the multi-feed of the document, the control unit determines, based on the document width and the document length, whether the size of the document corresponds to the size of the plastic card or the instant film.

4. The image reading device according to claim 1, wherein when the multi-feed detector detects the multi-feed of the document, the control unit acquires a document length from image data generated by the reading unit reading the document, the document length being a length of the document in the transport direction, and determines, based on the document width and the document length, whether the size of the document corresponds to the size of the plastic card or the instant film.

5. The image reading device according to claim 1, wherein when the multi-feed detector detects the multi-feed of the document, the control unit uses, as one of conditions for not executing the error processing, a transport distance by the transport unit corresponding to a time period, in which the multi-feed is continuously detected, coinciding with a predetermined length of the plastic card or the instant film.

6. The image reading device according to claim 1, wherein the multi-feed detector includes a transmission unit configured to transmit ultrasonic waves and a reception unit configured to receive the ultrasonic waves having passed through the document, and when the multi-feed detector detects the multi-feed of the document and the control unit does not execute the error processing, the control unit increases a transmission level of the ultrasonic waves by the transmission unit to a value higher than a present value.

7. The image reading device according to claim 1, wherein the error processing includes stopping transport by the transport unit, the control unit is configured to cause the transport unit to start transport of the (n+1)-th document after the reading unit completes reading of the n-th document, n being an integer equal to or greater than 1, and in a case where the multi-feed detector detects the multi-feed of the n-th document, when it is determined that the size of the n-th document corresponds to the size of the plastic card or the instant film, and after the reading unit completes the reading of the n-th document, the control unit causes the transport unit to start the transport of the (n+1)-th document, and when it is determined that the size of the n-th document does not correspond to the size of the plastic card or the instant film, the control unit causes the transport unit to stop the transport of the (n+1)-th document, as the error processing.

8. The image reading device according to claim 1, wherein the error processing includes stopping transport by the transport unit, the control unit is configured to cause the transport unit to start transport of the (n+1)-th document before the reading unit completes reading of the n-th document, n being an integer equal to or greater than 1, and when the multi-feed detector detects the multi-feed of the n-th document, the control unit suspends the start of the transport of the (n+1)-th document until the control unit determines whether the size of the n-th document corresponds to the size of the plastic card or the instant film, when it is determined that the size of the n-th document corresponds to the size of the plastic card or the instant film, and before the reading unit completes the reading of the n-th document, the control unit causes the transport unit to start the transport of the (n+1)-th document, and when it is determined that the size of the n-th document does not correspond to the size of the plastic card or the instant film, the control unit causes the transport unit to stop the transport of the (n+1)-th document, as the error processing.

9. The image reading device according to claim 1, wherein the error processing includes stopping transport by the transport unit, the control unit causes the transport unit to start transport of the (n+1)-th document before the reading unit completes reading of the n-th document, and when the multi-feed detector detects the multi-feed of the n-th document, when it is determined that the size of the n-th document corresponds to the size of the plastic card and the instant film, the control unit causes the transport unit to start transport of the (n+2)-th document, and when it is determined that the size of the n-th document does not correspond to the size of the plastic card and the instant film, the control unit causes the transport unit to stop the transport of the (n+2)-th document, as the error processing.

10. An image reading method comprising:
a transporting step for transporting a document in a predetermined transport direction;
a reading step for reading the transported document by a reading unit;
a multi-feed detecting step for detecting a multi-feed of the document at a position upstream of the reading unit in the transport direction; and
a control step, wherein
when the multi-feed of the document is detected by the detecting the multi-feed of the document, the control step includes acquiring a document width from image data generated by the reading unit reading a leading end portion of the document, the document width being a length of the document in a width direction intersecting the transport direction, determining, based on the document width, whether a size of the document corresponds to a size of a plastic card or an instant film, not executing error processing in response to an occurrence of the multi-feed when it is determined that the size of the document corresponds to the size of the plastic card or the instant film, and executing the error processing when it is determined that the size of the document does not correspond to the size of the plastic card or the instant film.

* * * * *